No. 609,138. Patented Aug. 16, 1898.
F. J. BURRELL.
TUBE CUTTER.
(Application filed Dec. 16, 1897.)
(No Model.)
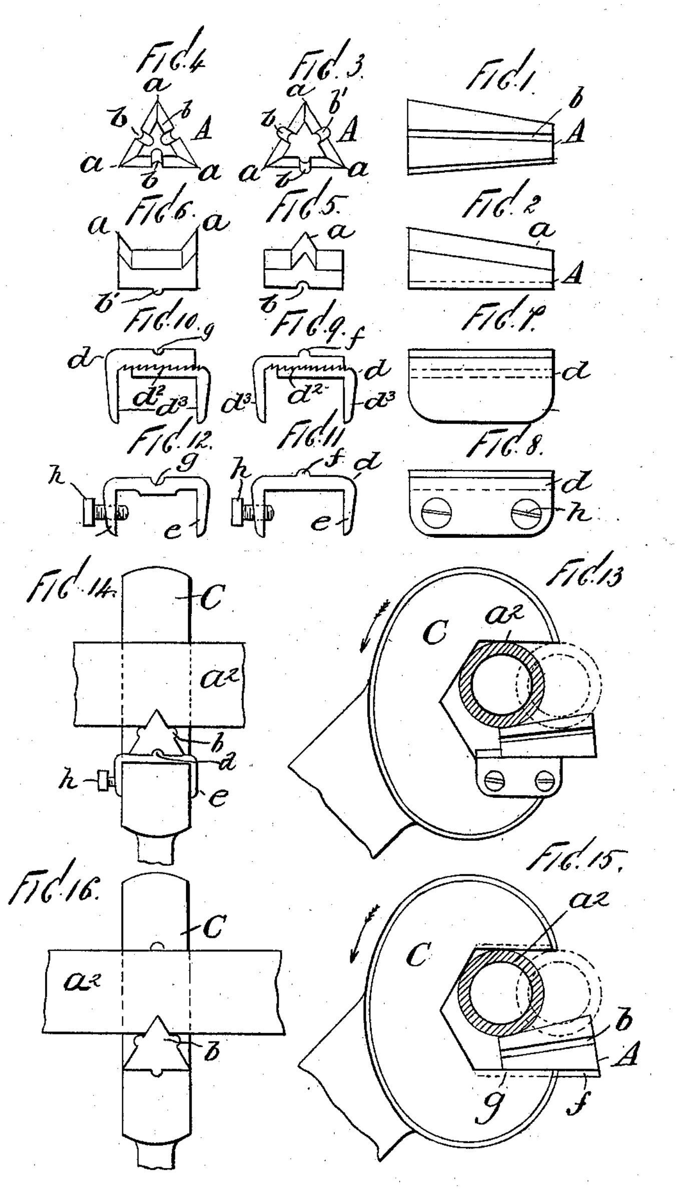
WITNESSES:
John Buckler,
L. M. Muller
Wm. A. Knowles
INVENTOR
Frederick J. Burrell,
BY
Edgar Tate & Co.
ATTORNEYS
THE NORRIS PETERS CO., PHOTO-LITHO., WASHINGTON, D. C.

UNITED STATES PATENT OFFICE.

FREDERICK JOHN BURRELL, OF THETFORD, ENGLAND.

TUBE-CUTTER.

SPECIFICATION forming part of Letters Patent No. 609,138, dated August 16, 1898.

Application filed December 16, 1897. Serial No. 662,107. (No model.) Patented in England September 22, 1894, No. 18,041.

*To all whom it may concern:*

Be it known that I, FREDERICK JOHN BURRELL, a subject of the Queen of Great Britain, residing at Thetford, in the county of Norfolk, England, have invented certain new and useful Improvements in Tube-Cutters, (patented in Great Britain September 22, 1894, No. 18,041,) of which the following is a full and complete specification, such as will enable those skilled in the art to which it appertains to make and use the same.

This invention relates to improved devices for cutting tubes, bars, and the like, and has for its object to provide a simple, cheap, readily-constructed, and perfectly-operating device applicable to existing hand-tools.

The invention consists in the novel construction and arrangement of parts hereinafter fully described.

In the accompanying drawings, Figures 1 and 2 are side elevations of two forms of cutters. Fig. 3 is an end view of Fig. 1. Fig. 4 is a similar view to Fig. 3, of a slightly-modified form. Figs. 5 and 6 are end views of Fig. 2, the latter slightly modified. Fig. 7 is a side elevation of the securing-clip forming part of the invention. Fig. 8 is a similar view of a modified form thereof. Figs. 9 and 10 are end views of Fig. 7, the latter being modified. Figs. 11 and 12 are end views of Fig. 8, the latter slightly modified. Figs. 13 and 14 are respectively a side elevation and plan view of a spanner to which the cutter is applied through the agency of the clip. Figs. 15 and 16 are similar views of grooved spanners in which the clip is dispensed with.

In the practice of my invention I construct a wedge-shaped or tapered metallic cutter A, which is shown separately in Figs. 1, 3, and 4, said cutter being provided with one or more cutting edges $a$. This cutter A is inserted in practice in the jaws of a spanner, wrench, or other tool C, as shown in Figs. 13 to 16, inclusive, and said tool is provided with either fixed or adjustable jaws, fixed jaws being shown in the drawings.

The tube $a^2$ or other article to be cut is first inserted between the jaws of the tool and the cutter A inserted between the said tube and the adjacent lower jaw. The tool is then turned in the direction indicated by the arrows in Figs. 13 and 15, which operation forces the edge of the cutter in contact with the tube as the turning of the tool revolves the same, said cutter thus engaging with its edge the surface of said tube and by reason of its being tapered or wedge-shaped is forced farther into the jaws of the tool, thus being automatically tightened by the turning of said tool, and in this operation the edge of the cutter sinks into the tube, and said cutter will adjust itself to the required depth of the cut and is so efficient in operation that a single turn of the tool will usually suffice to cut a tube of ordinary thickness. The dotted lines in Figs. 13 and 15 indicate the position assumed by the tube after the tool has been turned and the cutting operation performed.

In Figs. 1, 3, and 4 I have illustrated a cutter A which is triangular in cross-section and provided with three cutting edges $a$, and each of which is longitudinally tapered and provided with longitudinal grooves $b$, as shown in Fig. 4, or ribs $b'$, as shown in Fig. 3. Each edge of the cutter may be utilized for cutting, and the grooves $b$ or ribs $b'$ are designed to adapt the cutter to clips or clamps, as hereinafter described, in connection with which said cutters are used.

I may also form the cutter rectangular in cross-section, as shown in Figs 2, 5, and 6, with a single longitudinal cutting edge $a$, which is beveled on both sides, as shown in Fig. 5, or the cutters may be provided with two longitudinal cutting edges beveled on one side, as shown in Fig. 6, and these cutters are provided with the longitudinal groove $b$ or rib $b'$, hereinbefore described.

In order that the cutters may be maintained at right angles or radially to the tube, I also provide a clip or clamp $d$, (shown in Figs. 7, 9, and 10,) comprising two plates having interlocking teeth or projections on their adjacent surfaces $d^2$, and each of which is provided at its outer edge with an angular flange $d^3$, whereby the cutter may be connected with one jaw of the tool, and these clips are provided at the back thereof with a groove $g$ or rib $f$ to receive the rib $b'$ or the groove $b$ of the cutter.

This construction may be modified, however, as shown in Figs. 8, 11, and 12, in which the clip or clamp $d$ is composed of one piece and provided at the back with the groove $g$ or rib $f$ and with side plates $e$, through one of which is passed a set-screw $h$, the side plates $e$ being the same as the side plates $d^3$, (shown in Figs. 7, 9, and 10,) and the groove $g$ or rib $f$ is designed to receive the rib $b'$ or the groove $b$ of the cutter.

In order to dispense with the clip or clamp, the groove $g$ or the rib $f$ may be formed in the jaw of the tool, as shown in Fig. 15, and the same result will be produced.

I do not confine myself to the exact formation of the parts or details of construction herein set forth and illustrated, as the same may be changed or varied in immaterial particulars without altering the nature or character of the invention, the advantages resultant from which will be manifest.

Having thus fully described my invention, what I claim as new, and desire to secure by Letters Patent, is—

1. In a cutter for tubes or the like, a cutter triangular in cross-section having three cutting edges longitudinally tapered and adapted to slide in the jaws of a hand-tool to wedge between the same and the article to be cut, substantially as described.

2. In a cutter for tubes or the like, the combination with a blade having a beveled cutting edge tapered longitudinally and having longitudinal grooves therein, of a clip provided with side flanges to clasp the jaw of a hand-tool, and means whereby said clip is secured to said jaw, said clip being longitudinally ribbed to receive the groove of the cutter, substantially as described.

3. In a cutter for tubes or the like, the combination with a hand-tool having a recessed head to form jaws between which a tube may be inserted, of a blade having a beveled cutting edge longitudinally tapered and having longitudinal grooves therein, one of said jaws being provided with a longitudinally-extended rib adapted to coact with the groove in said blade, substantially as described.

4. In a cutter for tubes or the like, the combination with a spanner or the like, of a cutter comprising a cutter triangular in cross-section having three beveled cutting edges tapered longitudinally, and having longitudinally-extended grooves therein between each tube and said cutting edges, said spanner being provided with ribs adapted to coact with said grooves to limit the movement of said cutter, substantially as described.

5. In a cutter for tubes or the like, the combination with a blade having a beveled cutting edge, longitudinally-extended grooves therein and tapered longitudinally, of a clip comprising two plates, ratchet-teeth thereon and downwardly-extended flanges whereby said clip is secured to said jaw, said clip being provided with a rib adapted to coact with the groove of said blade, substantially as described.

In testimony that I claim the foregoing as my invention I have signed my name, in presence of the subscribing witnesses, this 2d day of December, 1897.

FREDERICK JOHN BURRELL.

Witnesses:

ALEXANDER ALCOURT DAY,

ALBERT ELLIOTT.